Figure 1:
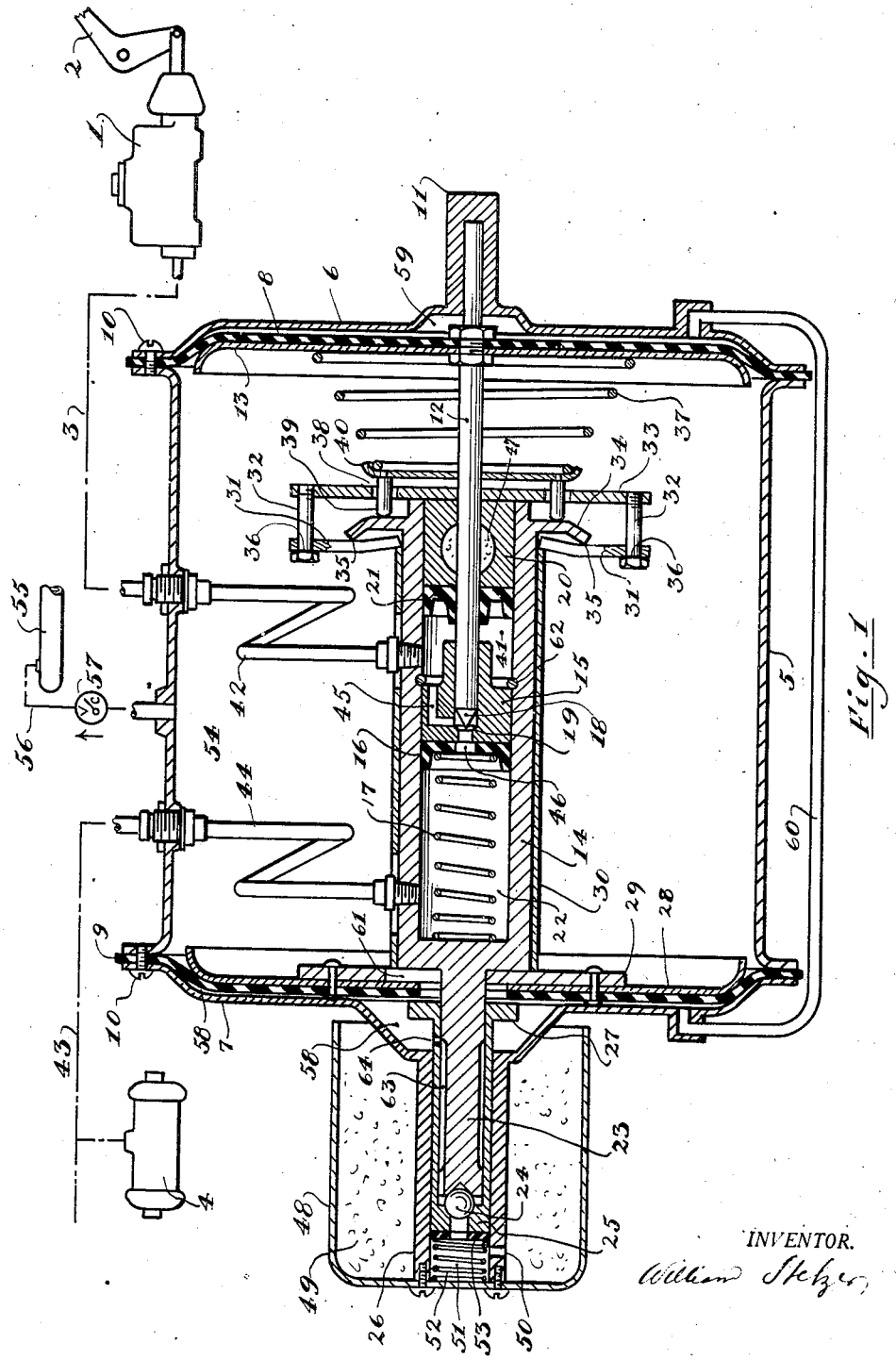

Dec. 7, 1943.  W. STELZER  2,336,374
HYDRAULIC BRAKE BOOSTER
Filed April 3, 1942  2 Sheets—Sheet 1

INVENTOR.
William Stelzer

Dec. 7, 1943.   W. STELZER   2,336,374
HYDRAULIC BRAKE BOOSTER
Filed April 3, 1942   2 Sheets-Sheet 2
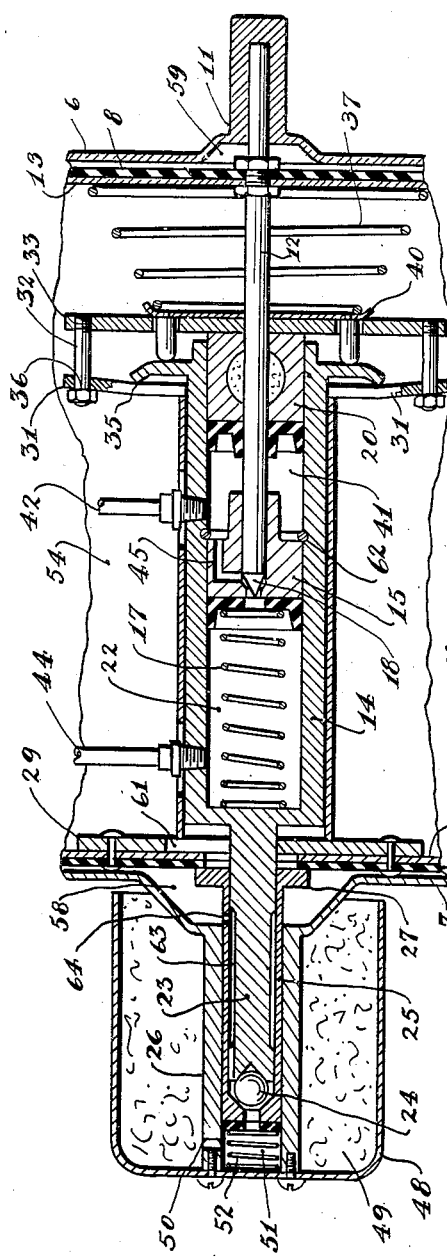
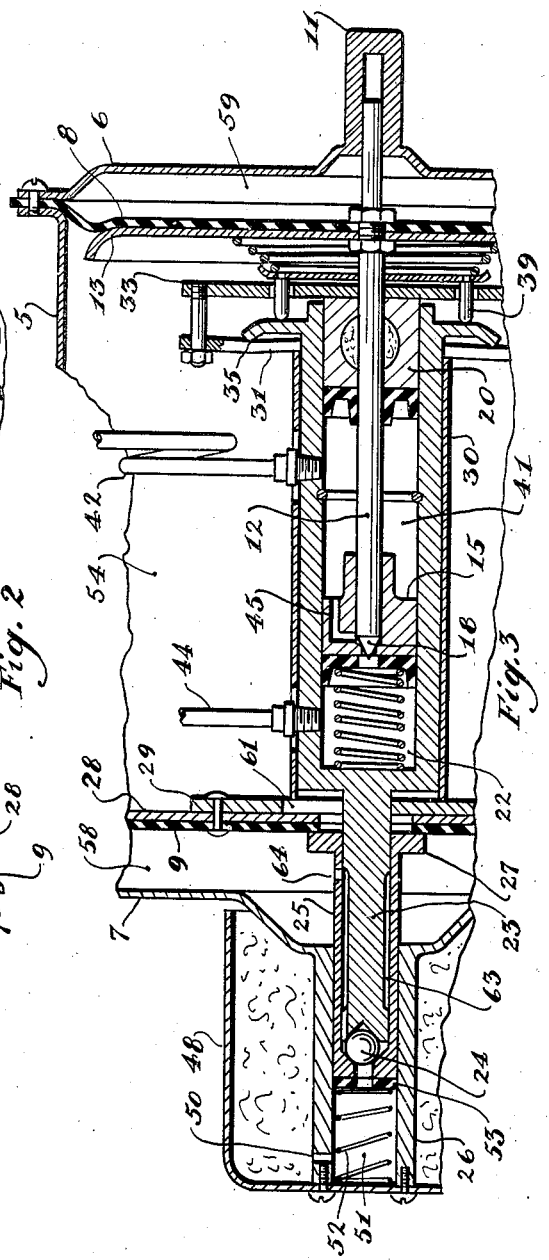
INVENTOR.
William Stelzer Patented Dec. 7, 1943

2,336,374

UNITED STATES PATENT OFFICE 2,336,374

HYDRAULIC BRAKE BOOSTER

William Stelzer, Detroit, Mich.

Application April 3, 1942, Serial No. 437,528

12 Claims. (Cl. 60—54.5)

The invention relates to brake boosters and more particularly to a brake booster for vehicles with hydraulic brakes where the booster constitutes a self-contained unit acting as a power reservoir and where a plurality of power pistons or expansible chamber motor mechanisms are used.

The object of the invention is to increase the power of the booster and to reduce the size, particularly the diameter. Another object is to utilize the necessary power elements to serve as control means whereby the construction is greatly simplified.

Another object of the novel invention is to reduce the number of hydraulic seals to limit the possibility of hydraulic leakage to a minimum.

Other objects and features will appear by inspection of the drawings, wherein:

Fig. 1 shows a cross sectional side elevation of the booster unit with the conventional hydraulic system shown diagrammatically, Fig. 2, a fragmentary cross-sectional side elevation of the booster unit while in operation; and, Fig. 3, a fragmentary cross-sectional side elevation of the booster unit while in a holding position where the brakes remain applied at an unchanged rate.

Describing the invention now in detail there is shown a conventional master cylinder I operated by the operator by means of a brake pedal 2 to produce a hydraulic pressure in line 3 and to operate wheel cylinders 4 of which there are usually a plurality but only one is shown in order not to encumber the drawings.

In the hydraulic line 3 I interpose the novel booster unit which consists of a reservoir housing 5 containing the booster mechanism. The sides of the cylindrical housing 5 are closed off by a cover 6 and a cover 7 with diaphragms 8 and 9 interposed respectively. These diaphragms, being clamped between the housing and the covers by means of screws 10, also serve to seal the joint. Cover 6 has a boss 11 extending from its center portion and is adapted to guide piston rod 12 which is slideable therein. The piston rod 12 has secured to it a piston 13 against which diaphragm 8 acts co-axial with piston rod 12. There is a hydraulic cylinder 14 within said reservoir housing containing a piston 15 having a seal 16 held against said piston by a spring 17. The center of piston 15 has a bore to receive piston rod 12 whose extremity 18 is tapered to serve as a valve to engage valve seat 19. At the end of cylinder 14 there is a piston 20 and a seal 21 to serve as a stuffing box for piston rod 12. The other end of cylinder 14 is closed to form a chamber 22, and has a rod 23 co-axial with said cylinder 14, serving as a valve in conjunction with ball 24 and valve plunger or sleeve 25 which is slideable in boss or valve housing 26 extending from the center portion of end cover 7. Valve plunger 25 has a valve head 27 at one end to act against diaphragm 9 which is secured to piston 28 and reinforcement 29 slideable on rod 23. Slideable over cylinder 14 there is a sleeve 30 in contact with reinforcement 29 and levers 31 which are pivoted on studs or screws 32 secured to plate 33 slideable on rod 12 and in contact with piston 20. Cylinder 14 has a flange 34 whose outer peripheral extremity provides a fulcrum point for levers 31 at 35. Thus levers 31 pivot about this point and rock on studs 32 for which purpose the heads of the latter are so formed that levers 31 contact them at points 36. Flange 34 also serves to receive the action of return spring 37 for which purpose clearance holes 38 are provided in plate 33 to accommodate pins 39 extending from disc 40 in contact with spring 37. Hydraulic line 3 from master cylinder I leads to chamber 41 through a flexible hose 42. Chamber 22 is in communication with the wheel cylinders 4 through line 43 and flexible hose 44. There is also a communication between chambers 41 and 22 through passage 45 and hole 46.

In order to provide a wetted surface on piston rod 12 when the latter operates piston 15 I provide a hole 47 in piston 20 containing a wick of felt or other similar material saturated with brake fluid.

48 designates the air cleaner or filter for the booster and is secured to extension 26 and provided with a filtering material 49. A hole 50 in extension 26 admits air to chamber 51 which contains a light spring 52 acting against valve plunger 25 with a seal 53 interposed.

Chamber 54 serves as a reservoir for the vacuum power which in this embodiment is derived from a manifold 55 which may also indicate a pump or other source of vacuum, where line 56 indicates a tube or hose to chamber 54 with a check valve 57 interposed. Chambers 58 and 59 are in communication through a tubing 60.

Having thus described the necessary elements of the novel construction I shall now illustrate the operation of same. Assuming the braking system and the booster to be in the "off" position as shown in Fig. 1, and chamber 54 under vacuum pressure, it will be observed that the same pressure exists in chambers 58 and 59, because valve head 27 is unseated from diaphragm 9 and communication is established through passage 61 in reinforcement 29. Chamber 51 represents atmospheric pressure and is closed off from chambers 58 and 59 as ball 24 is seated on plunger 25 by virtue of spring 52.

Assuming now that the operator depresses brake pedal 2 and operates master cylinder I, a hydraulic pressure is produced in line 3 and communicated to chamber 41. As the passage is open between chambers 41 and 42 hydraulic fluid flows from master cylinder I to wheel cylinders 4 to operate the latter and to engage the brake shoes with the brake drums. No action is taking place in the brake booster mechanism because the hydraulic pressure is too low to actuate piston 20 and to overcome spring 37. The latter is selected of sufficient stiffness to resist compression while the brake shoes are being extended for which operation a very low pressure is required but which varies in different braking systems. As the brake shoes come in contact with the brake drums the resistance to further expansion increases and, therefore, the pressure in lines 43 and 3 also increases, requiring a greater effort by the operator. Due to the increased pressure in chamber 41 acting against seal 21 and piston 20 and plate 33, the latter presses against lever 31 at point 36, creating a reaction against cylinder 14 on points 35 to urge piston 14 to move towards power piston 13 and compressing spring 37 whereby piston 15 resting against stop ring 62 moves into engagement with the conical end 18 urged by spring 17 to close valve seat 19.

The movement of cylinder 14 in the direction mentioned permits a movement of valve plunger 25 in the same direction to seat on diaphragm 9. As valve head 27 is seated on diaphragm 9 and cylinder 14 continues to move in the direction mentioned due to the actuation of piston 20, plunger 23 moves away from plunger 25 because movement of the latter is arrested when it has come in contact with diaphragm 9, whereby ball 24 is unseated from plunger 25 and air admitted from the atmosphere through chamber 51, passage 63, and hole 64 into chamber 58, from where the pressure is communicated through connection 60 to chamber 59 this operating position is illustrated in Fig. 2. As a greater pressure exists now in chambers 58 and 59 than in chamber 54 pistons 13 and 28 are urged to move towards each other which causes a reduction in the volume of chamber 22 and an increase in the volume of chamber 41 into which the operator forces hydraulic fluid to maintain the same hydraulic pressure as exists in master cylinder 1. While the two pistons 13 and 28 move towards each other the force produced on piston 20 by the pressure in chamber 41 and the force produced with piston 28 due to the air pressure in chamber 58 act against each other through plate 33, studs 32, levers 31 and slideable sleeve 30 whereby levers 31 are balanced on fulcrum point 35 at which point piston 28 and 20 act on cylinder 14 to move the latter towards piston 13. It is apparent the operating position illustrated in Fig. 2 can last only a short moment, because when valve 24 is wide open fluid under pressure is admitted to chambers 58 and 59 at a greater rate than is necessary to operate the diaphragm pistons. As a consequence as soon as chamber 58 is under pressure, the valve opening between 24 and 25 is reduced so that just enough air flows through it to maintain a pressure in chamber 58 to balance or oppose the hydraulic pressure acting on piston 20. This will be understood by considering that if too much air were admitted to chambers 58 and 59 the force transmitted through sleeve 30 would be greater than the force transmitted through studs 32, consequently sleeve 30 would slide to the right, seating ball 24 and unseating valve 27, thus reducing the pressure in chambers 58 and 59 again. The fact whether diaphragm piston 28 and sleeve 30 actually move to the right, or whether cylinder 14 moves to the left makes no difference as far as the balance of forces or the operation of the valves is concerned. This indifference is illustrated if it is assumed again that too much air has been admitted to chambers 58 and 59, but that this time piston 28 remains stationary. Since the pressure in chamber 22 is the sum of the pressure transmitted through rod 12 and the hydraulic pressure in chamber 41 acting on piston 15, due to the excess pressure in chamber 59, the hydraulic pressure in chamber 22 acting to move cylinder 14 to the left overpowers piston 20 and moves it to the left also but at an increased pace, sleeve 30 being stationary and acting as a fulcrum for levers 31. While cylinder 14 moves to the left, ball 24 becomes seated, which is the same result as obtained when piston 28 moves toward the right. This example illustrates also that both power pistons, 28 and 13, function as control means to keep the hydraulic pressure in chamber 22 and wheel cylinders 4 in a pre-determined proportion to the pressure in chamber 41 and master cylinder 1.

While there is no fixed relation between the movements of pistons 13 and 28 while they move towards each other during a brake application because their action is differential, it is immaterial to the function of the booster whether both diaphragm pistons move toward each other at the same time or whether one moves first and then the other. Nevertheless, after one piston has moved a certain distance from the starting position, the effective area is decreased, so that the other piston in a retarded position will produce a greater pressure and therefore have an inherent urge to catch up with the other one. While part of the force of spring 17 causes a slight tendency to retard piston 13, this action is so weak in proportion to the forces of power that it appears negligible. It will be noticed that spring 37 acts equally on both pistons so that it has no retarding effect on either one.

The proportion of levers 31 relative to the position of fulcrum point 35 determines the booster ratio, i. e., the relation of manual effort to the boosted pressure. In the embodiment shown the force of power is approximately equal to the manual force so that the boosted pressure is approximately twice as great as the pressure produced in master cylinder 1 fulcrum point 35 being approximately in the center of levers 31, and neglecting the area of rod 12 and the action of springs 17 and 37. Diaphragm piston 28 counterbalances piston 20 over levers 31 of equal arms, hence their forces are equal. Piston 13 being equal in area to piston 28, its force is also equal to that of piston 20. Since the pressure in chamber 22 equals the sum of the pressure exerted by piston 13 and the hydraulic pressure in chamber 41 (which acts equally against piston 20 and piston 15), the pressure in chamber 22 is twice the pressure in chamber 41. The proportion of the levers 31 may be selected to obtain the desired booster ratio.

When the brakes are applied and the brake pedal is held in a depressed position, after enough air has been admitted to chamber 58 the force acting on piston 28 and transmitted through sleeve 30 acting on levers 31 overpowers the force produced by piston 30, whereby piston plate 28 moves towards cylinder 14 urging piston 20 to move into cylinder 14 to reduce chamber 41. The movement of piston 28 towards cylinder 14 permits a movement of valve plunger 25 to follow said piston plate 28 by virtue of spring 52 whereby valve ball 24 is seated on plunger 25 and the admission of air to chamber 58 is interrupted. This is the holding position, as illustrated in Fig. 3. In this position no power is consumed and no movement takes place within the booster unit, as valves 24 and 27 are closed.

When the operator releases his foot from the brake pedal 2 whereby the pressure in master cylinder 1 and chamber 41 is suddenly reduced the system is immediately unbalanced, piston plate 28 pressing against sleeve 30 and levers 31 force piston 20 towards chamber 41, as the latter does not offer sufficient resistance, whereby valve seat 27 loses contact with diaphragm 9 and passage is established between chambers 54 and 58 and 59 so that the pressure in the latter is immediately relieved into chamber 54. As the forces of pistons 28 and 13 are therefore reduced springs 17 and 37 urge cylinder 14 and piston 15, as well as the power pistons 13 and 20 to the "off" position as shown in Fig. 1. Piston 15 comes into contact with stop ring 62 but piston rod 12 and piston 13 continue to move a short distance in order to open the hydraulic passage between chamber 22 and 41 whereby hydraulic fluid from wheel cylinders 4 may return to the master cylinder while the return springs in the brakes move the brake shoes to their "off" position.

For illustrative purposes the drawings have been made diagrammatic and the valve movements exaggerated. Furthermore the openings in sleeve 30 to accommodate the fittings of lines 42 and 44 in actual practice may be made much smaller than shown, allowing a small clearance. This may prevent excessive endwise motion of sleeve 30 relative to cylinder 14 in case of failure of the source of vacuum.

While in the preferred embodiment the two expansible chamber motor mechanisms are of the diaphragm type, using diaphragms 8 and 9, it is apparent that any other type of conventional piston may be used, particularly of the sliding type.

I am aware that the invention can be carried out in ways different from that shown without departing from the scope of the invention, therefore, I do not wish to be limited except as outlined by the terms of the appended claims.

I claim:

1. In a vehicle having a master cylinder operated by the operator and wheel cylinders to operate the brake shoes, in combination, a power reservoir, a hydraulic booster within said power reservoir, an expansible chamber motor mechanism at each end of said hydraulic booster to operate said booster, said hydraulic booster having a cylinder operatively connected to one of said expansible chamber motor mechanisms to be moved thereby, and a piston operatively connected with the other one of said expansible chamber motor mechanisms to be moved thereby.

2. In a brake booster, in combination, a vacuum cylinder to serve as a power reservoir and as a power cylinder, a hydraulic booster cylinder within said vacuum cylinder, a diaphragm piston at each end of said vacuum cylinder to operate said hydraulic booster cylinder, covers endwise of said vacuum cylinder with said diaphragm piston interposed to produce a pressure chamber between a diaphragm piston and a cover to which air pressure may be directed to actuate said pistons for the operation of said booster cylinder, said hydraulic booster cylinder having a piston therein, a piston rod to connect the latter to one of said diaphragm pistons, said hydraulic booster cylinder being operatively connected with said other diaphragm piston to be moved endwise thereby to produce a boosted hydraulic pressure in said hydraulic booster cylinder, and fluid pressure transmitting means connected to said hydraulic booster cylinder.

3. In a vehicle having a master cylinder operated by the operator and wheel cylinders to operate the brake shoes, in combination, a cylinder, a cover at each end of said cylinder, a diaphragm piston at each end within said cylinder to divide said cylinder into two endwise pressure chambers and a central reservoir chamber, a hydraulic booster within said cylinder, said booster comprising a hydraulic cylinder operatively connected with one of said diaphragm pistons, a piston slidable in said hydraulic cylinder to divide the latter into a high pressure chamber and a low pressure chamber, said high pressure chamber being connected with a fluid pressure transmitting line to said wheel cylinders and said low pressure chamber being in communication with said master cylinder, a piston rod connecting said piston with the other of said diaphragm pistons, valve means, and means responsive to the hydraulic pressure of said master cylinder to operate said valve means to direct air pressure to said pressure chambers.

4. In a vehicle having a master cylinder operated by the operator and wheel cylinders to operate the brake shoes, in combination, a cylinder, a cover at each end of said cylinder, a plate member at each end within said cylinder to divide said cylinder into two endwise pressure chambers and a central reservoir chamber, said plate members being arranged to slide endwise in said cylinder and having a seal between their outer periphery and the wall of said cylinder, a hydraulic booster within said reservoir chamber, said booster comprising a hydraulic cylinder and a piston slidable therein to divide said cylinder into two chambers one of which is connected hydraulically to said wheel cylinders and the other to said master cylinder, a piston rod to transmit the pressure of one of said plate members to said piston, whereas the other plate member is operatively connected to move said booster cylinder, valve means, and means responsive to the hydraulic pressure of said master cylinder to operate said valve means to direct air pressure to said pressure chambers.

5. In a vehicle having a master cylinder operated by the operator and wheel cylinders to operate the brake shoes, in combination, a brake booster having a power cylinder, a pair of opposed plate members slidable in said power cylinder to divide the latter into two endwise pressure chambers and a central reservoir chamber, said plate members having seals to prevent the passage of fluid from said pressure chambers to said reservoir chamber, a hydraulic booster cylinder within said reservoir chamber, a piston slidable in said booster cylinder to divide the latter into two chambers, one of said chambers being connected hydraulically to said wheel cylinders and the other to said master cylinder, a piston rod to transmit the pressure from one of said plate members to said piston, the other plate member being operatively connected to transmit its pressure to said booster cylinder to urge the latter to move in an opposite direction to said piston in order to increase the hydraulic pressure in that chamber of the booster cylinder that is in communication with said wheel cylinders, valve means to direct air pressure to and from said endwise pressure chambers, means responsive to the hydraulic pressure in said master cylinder to urge said valve means to direct air pressure to said endwise pressure chambers, and means responsive to the pressure of the plate member that is transmitted to said booster cylinder to urge said valve means to decrease the air pressure directed to said endwise pressure chambers.

6. In a braking system for vehicles having a master cylinder operated by the operator and wheel cylinders to actuate the brake shoes, in combination, a brake booster comprising a pair of spaced expansible chamber motor mechanisms, a movable hydraulic cylinder intermediate said expansible chamber motor mechanisms, a slidable piston in said hydraulic cylinder to divide the latter into two chambers, one of which is in communication with said master cylinder and the other with said wheel cylinders, a piston rod to transmit the force from one of said expansible motor mechanisms to said piston to move the latter and to reduce the volume of that chamber that is in communication with said wheel cylinders, means to transmit the force from the other expansible chamber motor mechanism to said hydraulic cylinder to urge the latter to move in an opposite direction to said piston to further decrease the volume of the chamber in communication with said wheel cylinders, a source of air pressure, valve means to direct air pressure to and from said expansible chamber motor mechanisms, means responsive to the hydraulic pressure produced by said master cylinder to urge said valve means to direct air pressure to said expansible chamber motor mechanisms, and means responsive to the hydraulic pressure transmitted to said wheel cylinders and the force transmitted from said expansible chamber motor mechanism to said hydraulic cylinder to urge said valve means to direct air pressure from said expansible chamber motor mechanism to decrease the hydraulic pressure transmitted to said wheel cylinders.

7. The construction as claimed in claim 6, and means to provide the passage of fluid between said chambers when the hydraulic pressure in said master cylinder is higher than in said wheel cylinders and when said brake booster is in the "off" position.

8. The construction as claimed in claim 4, where said central reservoir chamber is connected to a source of vacuum.

9. In a vehicle having a master cylinder operated by the operator and wheel cylinders to operate the brake shoes, in combination, a brake booster comprising a hydraulic cylinder, a piston in said cylinder to divide the latter into two chambers, a fluid transmitting line from one chamber to said master cylinder, a fluid transmitting line from the other chamber to said wheel cylinders, means adapted to let fluid pass from said wheel cylinders to said master cylinder when said brake booster is in the "off" position, a piston rod engaging said piston and passing through said chamber that is in communication with said master cylinder, a control piston in contact with the fluid that is in communication with said master cylinder, an expansible chamber motor mechanism to act on said piston rod to move said piston into said cylinder to increase the pressure in the chamber in communication with said wheel cylinders, another expansible chamber motor mechanism to act on said hydraulic cylinder in the opposite direction also to increase the hydraulic pressure in the chamber in communication with said wheel cylinders, a source of fluid power, valve means to direct fluid to and from said expansible chamber motor mechanisms to control the power of said expansible chamber motor mechanisms, said control piston responsive to the hydraulic pressure of said master cylinder urging said valve means to direct fluid from said source of fluid power to increase the power of said expansible motor mechanisms, and mechanical means responsive to the force exerted by said hydraulic cylinder due to the pressure in the chamber that is in communication with said wheel cylinders to urge said valve means to reduce the power of said expansible motor mechanisms.

10. In a hydraulic braking system for a vehicle having a master cylinder operated by the operator and wheel cylinders to operate the brakes, in combination, a brake booster having a cylindrical power reservoir to store vacuum power, power pistons endwise of said power reservoir to act as expansible motor mechanisms as there is thus formed a chamber between each end cover and the adjacent power piston, a slidable hydraulic cylinder within said power reservoir, a piston adapted to slide in said hydraulic cylinder to divide the latter into two hydraulic chambers, a hydraulic fluid transmitting line from one of said hydraulic chambers to said master cylinder, a hydraulic fluid transmitting line from the other hydraulic chamber to said wheel cylinders, means adapted to let hydraulic fluid pass from the chamber in communication with said master cylinder to the other chamber when the hydraulic pressure in the master cylinder is greater than in said wheel cylinders, means to provide a fluid passage between the two hydraulic chambers when said booster is in the "off" position, a piston rod entering said hydraulic cylinder through said chamber in communication with said master cylinder, said piston rod engaging said hydraulic piston at one end and one of said power pistons at the other, a slideable seal between said piston rod and said hydraulic cylinder, said seal being responsive to the hydraulic pressure in communication with said master cylinder, a source of vacuum, a fluid transmitting line from said source of vacuum to said power reservoir, a valve to direct air to and from said chambers of said expansible motor mechanism balancing lever means consisting in principle of a lever pivoted at an intermediate point to said hydraulic cylinder, one end of said lever being engaged by said fluid pressure sensitive seal and the other end of said lever being engaged by said power piston not in engagement with said piston rod, whereby the forces exerted by said power piston and said seal balance and weigh each other on the pivot on said hydraulic cylinder to move the latter with their united force, and means responsive to the excursions of said lever to operate said valve, where an excursion due to the force of said seal overpowering the force of said power piston operates said valve to direct air pressure to said chambers in said expansible motor mechanisms and an excursion due to the force of said power piston overpowering the force of said seal operates said valve to reduce the air pressure in said chambers of said expansible motor mechanisms.

11. The construction as claimed in claim 10, and stops to limit the excursions of said lever to a certain magnitude.

12. The construction as claimed in claim 10, where a plurality of balancing levers are used.

WILLIAM STELZER.